United States Patent
Li et al.

(10) Patent No.: US 6,865,311 B2
(45) Date of Patent: Mar. 8, 2005

(54) RE-CONFIGURABLE DISPERSION COMPENSATION MODULE (RDCM)

(75) Inventors: Jinghui Li, San Jose, CA (US); Tongqing Wang, Los Altos, CA (US); Xiaoli Fu, Nepean (CA); Tiangong Liu, Mountain View, CA (US); Genzao Zhang, Ottawa (CA)

(73) Assignee: Oplink Communications, Inc.

( * ) Notice: Subject to any disclaimer, the term of this patent is extended or adjusted under 35 U.S.C. 154(b) by 202 days.

(21) Appl. No.: 10/119,121

(22) Filed: Apr. 10, 2002

(65) Prior Publication Data

US 2004/0208619 A1 Oct. 21, 2004

Related U.S. Application Data

(60) Provisional application No. 60/330,903, filed on Nov. 2, 2001.

(51) Int. Cl.[7] .............................. G02B 6/35; G02B 6/26
(52) U.S. Cl. .............................. 385/17; 385/18; 385/24; 385/27
(58) Field of Search ............................. 385/15–18, 24, 385/27, 123

(56) References Cited

U.S. PATENT DOCUMENTS

2001/0024306 A1 * 9/2001 Okuno ........................ 359/161
2001/0048540 A1 * 12/2001 Konishi ...................... 359/180

* cited by examiner

Primary Examiner—John D. Lee
(74) Attorney, Agent, or Firm—Fish & Richardson P.C.

(57) ABSTRACT

A Re-Configurable Dispersion Compensation Module is provided. A new approach to the variable DCM, the RDCM combines existing optical switch technology with existing fixed DCM technology and advantageously also with existing TDCM technology into a programmable smart optical component. Advantageously Micro-Electrical Mechanical Switch (MEMS) optical switch technology may be used. The alternate RDCM technology provides a controller, and a set of controllable switches to employ a set of DCMs and TDCMs for adjusting the dispersion compensation along an optical signal path. This alternate RDCM technology mitigates the problems of conventional TDCMs, while fitting most of the requirements for high speed systems, and being of a compact size.

20 Claims, 9 Drawing Sheets

US 6,865,311 B2

RE-CONFIGURABLE DISPERSION COMPENSATION MODULE (RDCM)

CROSS-REFERENCES TO RELATED APPLICATIONS

This application claims the benefit of U.S. Provisional Application 60/330,903, filed Nov. 2, 2001.

FIELD OF THE INVENTION

The invention relates to dispersion compensation in optical communication systems, and more particularly to tunable dispersion compensation modules for high speed optical transmission in optical communications systems.

BACKGROUND OF THE INVENTION

Dispersion compensation is one of the key elements of high speed optical transmission. Dispersion compensation traditionally involves the use of dispersion compensators at various points along an optical signal propagation path typically at amplifier sites to compensate for the dispersion caused by the fiber and elements along the span since the last dispersion compensation. Dispersion compensator modules (DCMs) are rated by the amount of dispersion they compensate and can be fixed in value or variable (tunable). Variable or tunable functioning of dispersion compensation modules is desirable for numerous reasons including the following: simplification of the network design; allowance of the reconfiguration of the network topology, reduction of inventory; reduction of turn-up time in the field and making the network more robust against aging, temperature change, and re-routing. Each of these represents potential cost savings and potential enhancement of network performance.

In the past, in working towards these benefits, most of the prior art has focused on tunable DCM (TDCM) development. All of the potential TDCM designs to date, however, have issues associated with them which are difficult to overcome. For example Virtual Imaged Phase Array approaches have very low yield due to tight optical alignment, Fiber Bragg Grating (FBG) based technologies have group delay ripple problems, and Fabry-Perot filter (F-P) based technology has a small tuning range.

It would be desirable for there to be a variable or tunable dispersion compensation module which mitigates these problems and moreover is compact and reliable.

SUMMARY OF THE INVENTION

The present invention provides a new approach to the variable DCM by providing a Re-Configurable Dispersion Compensation Module (RDCM) which combines existing optical switch technology with existing fixed DCM technology and advantageously also with existing TDCM technology into a programmable smart optical component. Advantageously, existing Micro-Electrical Mechanical Switch (MEMS) optical switch technology can be used. This alternate RDCM technology mitigates some the problems with approaches of the prior art, while fitting most of the requirements for high speed systems, and being of a compact size. The use of MEMSs in the RDCM allows for the creation of protection channels to increase reliability. Being a smart optical component capable of being controllably set, the RDCM allows for high level management of a transmission line system.

According to a first broad aspect, the invention provides for a re-configurable dispersion compensation module having a plurality of dispersion compensation elements, at least one controllable optical switch, and a controller, in which the at least one controllable optical switch is optically coupled to an optical signal path, and coupled to the plurality of dispersion compensation elements, the at least one controllable optical switch controlled by the controller to couple a selected number of the plurality of dispersion compensation elements to the optical signal path for compensating the dispersion of optical signals therein.

Some embodiments of the invention provide for the plurality of dispersion compensation elements having N fixed dispersion compensation elements having respectively dispersion compensation values of V, 2V, 4V, . . . , $2^{N-1}V$.

Some embodiments of the invention provide for the plurality of dispersion compensation elements having a set of fixed dispersion compensation elements, and at least one tunable dispersion compensation element.

Some embodiments of the invention provide for at least one of the at least one tunable dispersion compensation element having a dispersion compensation value equal to the dispersion compensation value equal to V.

Some embodiments of the invention provide for at least one controllable optical switch having at least one MEMS optical switch.

Some embodiments of the invention provide for the controller being controlled by messages received along a control signal path coupled to the controller.

Some embodiments of the invention provide for the controller transmitting information along the control signal path.

According to a second aspect, the invention provides for a re-configurable dispersion compensation module having a set of N fixed dispersion compensation elements having respectively dispersion compensation values of V, 2V, 4V, . . . , $2^{N-1}V$, a tunable dispersion compensation element having a dispersion compensation value equal to V, a 2(N+1)×(N+1) MEMS optical switch optically coupled to an optical signal path by a first input, and optically coupled to the optical signal path by an (N+2)th output, and a controller, in which respective first to Nth outputs of the 2(N+1)×(N+1) MEMS optical switch are coupled to respective inputs of the N fixed dispersion compensation elements, respective second to (N+1)th inputs of the 2(N+1)×(N+1) MEMS optical switch are coupled to respective outputs of the N fixed dispersion compensation elements, an (N+1)th output of the 2(N+1)×(N+1) MEMS optical switch is coupled to an input of the tunable dispersion compensation element, an (N+2)th input of the 2(N+1)×(N+1) MEMS optical switch is coupled to an output of the tunable dispersion compensation element, the 2(N+1)×(N+1) MEMS optical switch controlled by the controller to couple a selected number of the tunable dispersion compensation element and the N fixed dispersion compensation elements to the optical signal path for compensating the dispersion of optical signals therein.

According to a third aspect, the invention provides for a re-configurable dispersion compensation module having a set of N fixed dispersion compensation elements having respectively dispersion compensation values of V, 2V, 4V, . . . , $2^{N-1}V$, a tunable dispersion compensation element having a dispersion compensation value equal to V, a first (N+1)×(N+1) MEMS optical switch optically coupled to an optical signal path by a first input, a second (N+1)×(N+1) MEMS optical switch optically coupled to the optical signal path by an (N+1)th output, and a controller, in which a first output of the first (N+1)×(N+1) MEMS optical switch is coupled to an input of the tunable dispersion compensation element, an output of the tunable dispersion compensation element is coupled to a first input of the second (N+1)×(N+1) MEMS optical switch, respective second to (N+1)th outputs of the first (N+1)×(N+1) MEMS optical switch are coupled to respective inputs of the N fixed dispersion compensation elements, respective outputs of the N fixed dispersion compensation elements are coupled to respective second to (N+1)th inputs of the second (N+1)×(N+1) MEMS optical switch, respective first to Nth outputs of the second (N+1)×(N+1) MEMS optical switch are coupled to respective second to (N+1)th inputs of the first (N+1)×(N+1) MEMS optical switch, said first and second (N+1)×(N+1) MEMS optical switches controlled by the controller to couple a selected number of the tunable dispersion compensation element and the N fixed dispersion compensation elements to the optical signal path for compensating the dispersion of optical signals therein.

According to a fourth aspect, the invention provides for a re-configurable dispersion compensation module having a first 1×2 optical switch optically coupled to an optical signal path by an input, a second 1×2 optical switch optically coupled to the optical signal path by an output, and (N−1) 2×2 optical switches, in which the first 1×2 optical switch, the second 1×2 optical switch, the (N−1) 2×2 optical switches, and the N fixed dispersion compensation elements are coupled in a cascaded arrangement.

According to an second broad aspect, the invention provides for a re-configurable dispersion compensation module having a plurality of dispersion compensation elements, and at least one controllable optical switch, in which the at least one controllable optical switch is optically coupled to an optical signal path, and coupled to the plurality of dispersion compensation elements, the at least one controllable optical switch adapted to be controlled to couple a selected number of the plurality of dispersion compensation elements to the optical signal path for compensating the dispersion of optical signals therein.

Some embodiments of the invention provide for the tunable dispersion compensation element being coupled to the at least one controllable optical switch and the optical signal path between the controllable optical switch and the optical signal path.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which.

DETAILED DESCRIPTION OF THE PREFERRED EMBODIMENTS

Figure 1:
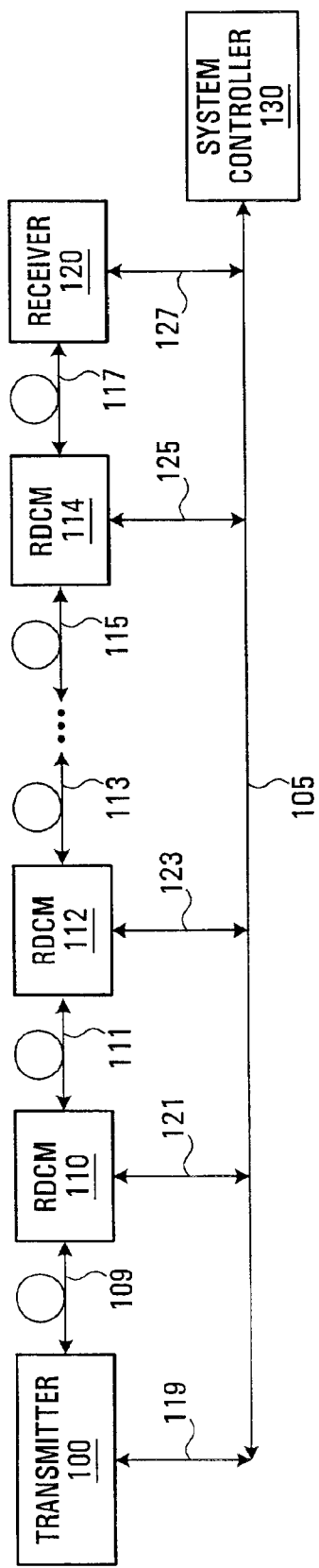
FIG. 1 is a diagram of a long haul fiber span arrangement in an optical network including RDCMs constructed according to the invention.

Referring to FIG. 1, a long haul fiber span arrangement in an optical network including RDCMs constructed according to the invention is described. In high rate (10 Gbps and above) long haul fiber, the chromatic dispersion in the network is carefully managed along an optical signal propagation path 109, 111, 113, . . . , 115, and 117 from a transmitter 100 to a receiver 120. RDCMs 110, 112, . . . , and 114, placed along the optical signal propagation path enables the network's management elements, for example a system controller 130, to remotely access and set the dispersion compensation of each module to optimize system performance. Control signal paths 105, 119, 121, 123, . . . , 125, and 127 used to allow the system controller 130, to remotely access and set the dispersion compensation of each RDCM 110, 112, . . . , and 114 could be a wavelength channel or any other available data communication medium.

Figure 2:
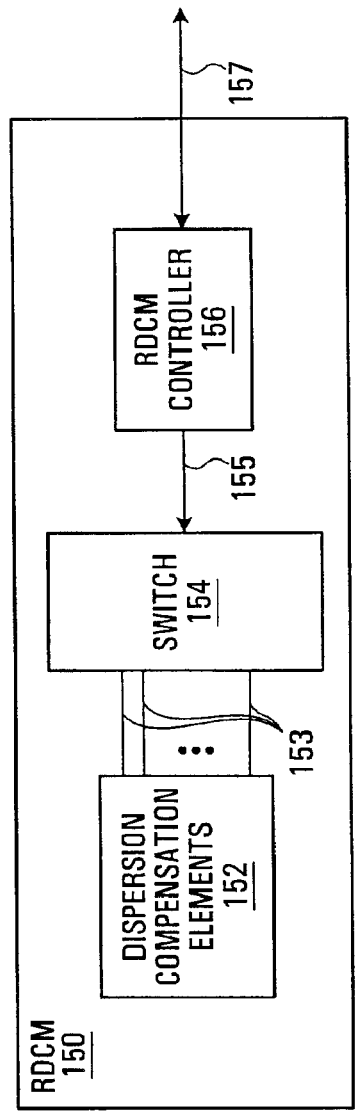
FIG. 2 is a functional block diagram of an RDCM constructed according to the invention.

Referring also to FIG. 2, the functioning of an RDCM constructed according to the invention is described. An RDCM 150 comprises dispersion compensation elements 152, connected by a plurality of optical connections 153 to a controllable optical switch or array of controllable optical switches 154. The controllable optical switch or array of controllable optical switches 154 is controllably set by an RDCM Controller 156 through controlling path or paths 155. Together, the controllable optical switch or array of controllable optical switches 154, the plurality of optical connections 153, and the dispersion compensation elements 152 comprise an RDCM dispersion compensation switching array. Example embodiments of RDCM dispersion compensation switching arrays constructed according to the invention are shown in the remaining figures. The RDCM Controller 156 operates to control the controllable optical switch or array of controllable optical switches 154 to employ a subset of the dispersion compensation elements 152 to achieve a desired amount of dispersion compensation that the RDCM is to provide for the optical signal path (not shown in the diagram). The RDCM Controller 156 is controlled by messages sent along control signal path 157 (corresponding to paths 121, 123, . . . , 125, and 127 of FIG.

1) and also feeds back the dispersion value of the RDCM via signal line 157 to the system controller 130 when requested by the system controller 130 to do so.

With reference to both FIG. 1 and FIG. 2, a procedure for managing dispersion compensation in an optical signal path employing RDCMs is described. There are two main states in this procedure, an initial dispersion compensation state and a dynamic dispersion compensation state. In the initial dispersion compensation state a procedure is followed in which the nominal system is powered up and initialized with default values and the communication link along control signal paths 105, 119, 121, 123, . . . , 125, and 127, between the system controller 130 to all RDCMs 110, 112, . . . , and 114, is established. A rough dispersion map configuration is then commenced, which involves configuring the RDCMs 110, 112, . . . , and 114, to their respective recommended values according to a recommended dispersion map (or distribution) over the link. At this point fixed DCMs of the dispersion compensation elements 152 are employed. Sequence dispersion fine tuning is then commenced which employs fine tuning stage by stage at each RDCM occurring in sequence from the transmitter 100 to the receiver 120 or from the receiver 120 to the transmitter 100. A TDCM of an RDCM (it is not necessary that every RDCM have a TDCM) can be used to achieve the best system performance. At each stage of fine tuning the RDCMs 110, 112, . . . , and 114, multiple steps of set and measure are implemented for the RDCM being fine tuned, while maintaining all uncompleted RDCM stages at the state it was after achieving the rough dispersion map configuration. Other system configurable parameters such as optical powers along the link, and wavelengths of the channels, etc. remain at their default values. At this point the initial dispersion compensation configuration is completed. Finally, dynamic dispersion compensation is commenced in which the system goes into a dynamic dispersion compensation state, in which RDCMs are controlled dynamically to compensate for network conditions, temperature changes, re-routing etc., for example through feedback from the receiver which is used to optimize the received signal.

Figure 3:
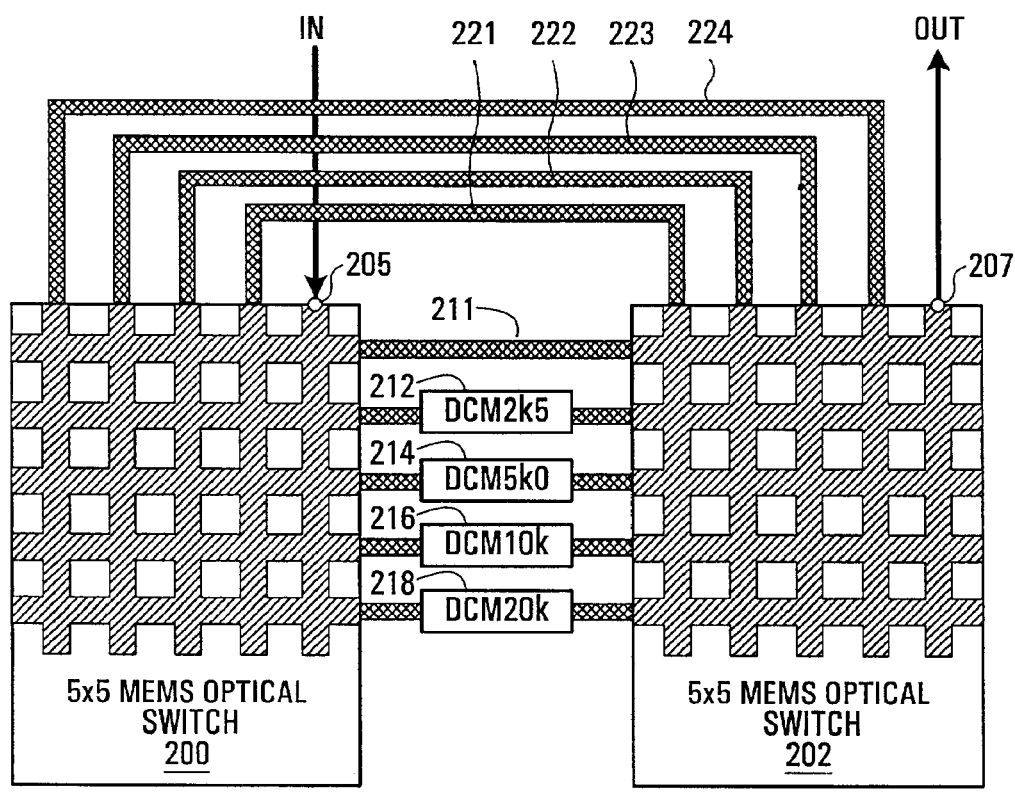
FIG. 3 is a diagram of an RDCM dispersion compensation switching array constructed according to an embodiment of the invention suitable for 0 km up to 38.75 km single mode fiber (SMF) dispersion compensation.

Referring to FIG. 3, an RDCM dispersion compensation switching array constructed according to an embodiment of the invention suitable for 0 km up to 38.75 km SMF dispersion compensation is described. As discussed in association with FIG. 2, the RDCM dispersion compensation switching arrays of FIG. 3 and all the remaining figures, comprises dispersion compensation elements 152, a plurality of optical connections 153, and a controllable optical switch or array of controllable optical switches 154. The controllable optical switch or array of controllable optical switches 154 is controllably set by an RDCM Controller 156 through controlling path or paths 155 both of which are not shown in FIG. 3 or the remaining figures. Although all of the preferred embodiments specifically deal with SMF dispersion, other possible types of dispersion are contemplated by the invention. In this preferred embodiment, the array of controllable optical switches comprise two 5×5 MEMS array optical switches, a first 5×5 MEMS array optical switch 200 and a second 5×5 MEMS array optical switch 202. As described below, the array of controllable optical switches need not be implemented with MEMS technology but may in general use any optical switching array technology. Also as described below the particular dimensions of the MEMS optical switches is not important as long as they are sufficient to meet minimum functional requirements.

Current MEMS optical switches (such as those available from Agilent™ and Agere™) implemented in the preferred embodiments have optical waveguides which intersect each other at right angles at intersection points into and out of which micro-electrical mechanical mirrors are mechanically are moved, the mirrors commonly oriented at a 45 degree angle to the waveguides. When a mirror is moved into an intersection point, the optical signals travelling along a waveguide arriving there are reflected by 90 degrees to propagate along another waveguide. When a mirror is moved out of an intersection point, the optical signals arriving there encounter no optical element and continue to propagate along the waveguide. It is commonplace for a MEMS device to have every mirror in it oriented in the same direction. The technology used in MEMSs and their operation is generally known in the art, the specifics of which are beyond the scope of this document.

Referring back to FIG. 3, an optical signal path on which incoming optical signals are traversing is connected to the first MEMS optical switch 200 at an input 205. An optical signal path on which outgoing optical signals traverse is connected to the second MEMS optical switch 202 at an output 207. Four output ports of the second MEMS optical switch 202 are connected through respectively a first optical waveguide portion 221, a second optical waveguide portion 222, a third optical waveguide portion 223, and a fourth optical waveguide portions 224 to four input ports of the first MEMS optical switch 200. One output of the first MEMS optical switch 200 is connected through a fifth optical waveguide portion 211 to one input of the second MEMS optical switch 202, and four output ports of the first MEMS optical switch 200 are connected through respective optical waveguides and four fixed DCMs, DCM2k5 212, DCM5k0 214, DCM10k 216, and DCM20k 218 to four input ports of the second MEMS optical switch 202. For each MEMS optical switch in this preferred embodiment, the set of output ports and the set of input ports used are chosen to be at 90 degrees relative to each other. In the configuration of this preferred embodiment, the fixed DCMs are arranged in stages where a DCM of a stage has a dispersion compensation value of twice that of the DCM of the previous stage. For example, in FIG. 3 the stage one DCM, DCM2k5 212, has a dispersion compensation sufficient to compensate for 2.5 km of fiber dispersion, the stage two DCM, DCM5k0 214 has a dispersion compensation sufficient to compensate for 5 km of fiber dispersion (twice that of stage one), the stage three DCM, DCM10k 216 has a dispersion compensation sufficient to compensate for 10 km of fiber dispersion (twice that of stage two), and the stage four DCM, DCM20k 218 has a dispersion compensation sufficient to compensate for 20 km of fiber dispersion (twice that of stage three). More generally, a set of N DCMs arranged in stages have a set of dispersion compensation values equal to $\{V, 2V, 4V, \ldots 2^{N-1}V\}$ where V is the dispersion compensation value of the stage one DCM. As will be discussed with reference to equations below and the remaining figures, the 5×5 MEMS optical switches 200 and 202 are controllably set by the RDCM Controller 156 through controlling path or paths 155 (not shown) to employ the correct number and choice of DCMs 212, 214, 216, and 218, and optical waveguide portions 211, 221, 222, 223, and 224 to effect a desired dispersion compensation to the optical signal originally input at the input 205, to be output at the output 207. Connections linking the controlling path or paths 155 used by the RDCM Controller 156 for controlling the switching arrays are not shown in the diagram. As will be explained fully below, although the RDCM of FIG. 3 is suitable for 38.75 km, it can only achieve an actual dispersion compensation of 37.5 km.

Figure 4:
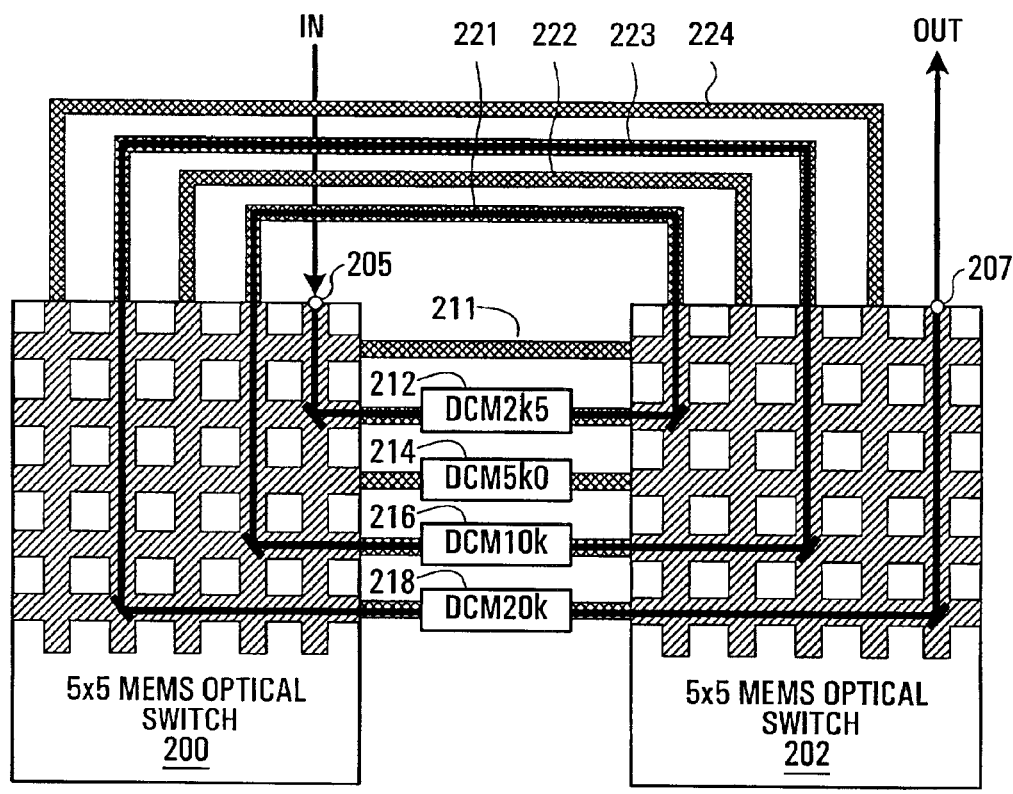
FIG. 4 is a diagram of the RDCM dispersion compensation switching array of FIG. 3 in operation, set to an actual compensation of 32.5 km SMF dispersion.

Referring now to FIG. 4 the RDCM dispersion compensation switching array of FIG. 3 in operation, set to an actual compensation of 32.5 km SMF dispersion is discussed. The first MEMS optical switch 200 is controllably set to allow the optical signal input from input 205 to traverse the DCM2k5 212 to the second MEMS optical switch 202 which is controllably set to allow that optical signal to traverse the first optical waveguide portion 221 back to the first MEMS optical switch 200. The first MEMS optical switch 200 is controllably set to allow the optical signal input from the first optical waveguide portion 221 to traverse the DCM10k 216 to the second MEMS optical switch 202 which is controllably set to allow that optical signal to traverse the third optical waveguide portion 223. The first MEMS optical switch 200 is controllably set to allow the optical signal input from the third optical waveguide portion 223 to traverse the DCM20k 218 to the second MEMS optical switch 202 which is controllably set to allow that optical signal to be output through the output 207. The result of the signal having passed through each of these DCMs is a dispersion compensation of 2.5 km+10 km+20 km=32.5 km SMF dispersion. In the context of using an RDCM, there are many applications which will have a minimum acceptable residual dispersion leftover by an RDCM, as well as a minimum required dispersion compensation to be achieved by an RDCM. For an RDCM built according to the arrangement of FIG. 3, the RDCM is capable of a maximum actual compensation of 37.5 km when all DCMs 212, 214, 216, and 218 are in use. The RDCM also has a resolution of 2.5 km, in that every possible value which is a multiple of 2.5 km up to 37.5 km may actually be compensated for by appropriate choice of the combination of the DCMs 212, 214, 216, and 218. This corresponds to a granularity of +/− 1.25 km, being the maximum possible uncompensated for length of fiber. Given the arrangement of FIG. 3 any required compensation of 38.75 km or less can be compensated by the RDCM with a residual dispersion of +/− 1.25 km or less. In this way an RDCM configured according to FIG. 3, is suitable for a maximum acceptable residual dispersion equal to half that which is compensated by its stage one DCM or equivalently is suitable for a maximum acceptable residual dispersion equal to half its resolution. It should be noted that this maximum is different for different fiber types and different data rates (10, 40, 80, and 160 Gb/s). Also, with a maximum acceptable residual dispersion equal to half the compensation of its stage one DCM, an RDCM built according to the arrangement of FIG. 3 is suitable for dispersion compensation equal to its maximum actual achievable dispersion compensation plus half the compensation of its stage one DCM. In this case therefore an RDCM built according to the arrangement of FIG. 3 is suitable for compensating 38.75 km of dispersion.

Figure 5:
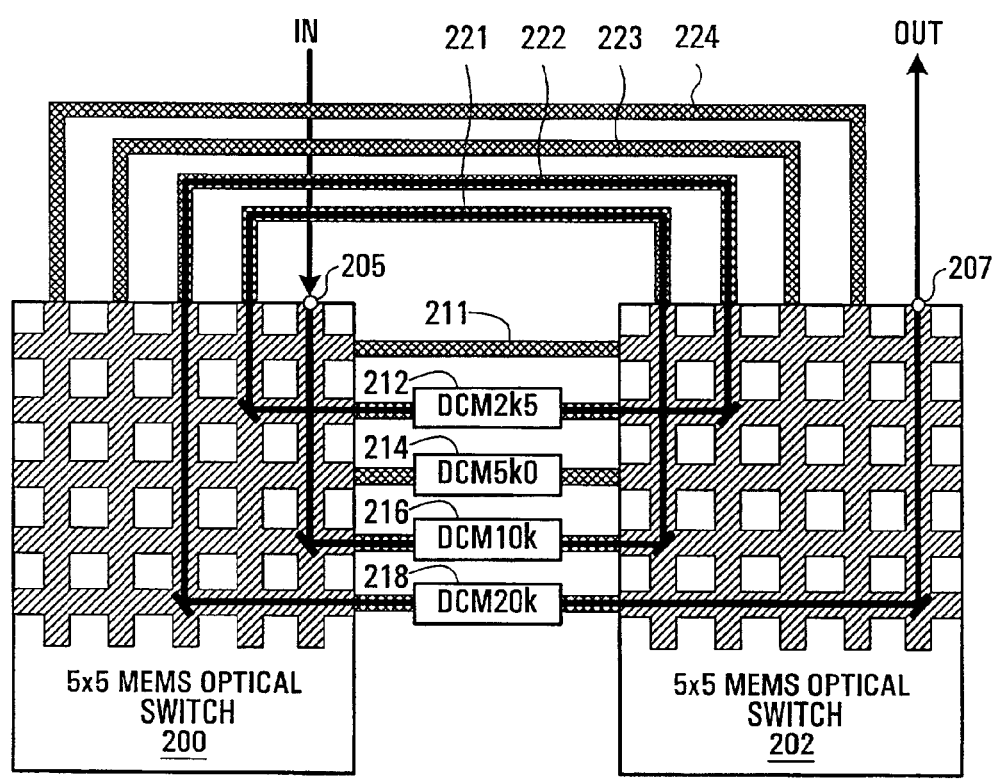
FIG. 5 is a diagram of the RDCM dispersion compensation switching array of FIG. 3 in operation, set to an actual compensation of 32.5 km SMF dispersion, illustrating failure protection of the preferred embodiment.

Referring now to FIG. 5 the RDCM dispersion compensation switching array of FIG. 3 in operation having a different operational state than that of FIG. 4 is described. In FIG. 5, the same DCMs are employed as those illustrated in FIG. 4, however, different waveguides and mirrors inside the MEMS optical switches, and different optical waveguide portions have been used. Array waveguides are preferably used in this embodiment because of the redundancy provided which allows for failure protection amongst the switching elements of the switch. If for example either of the mirrors directly adjacent either side of the DCM2k5 212 (as shown in FIG. 4) were to fail, then the MEMSs 200, 202 could be controllably set so that mirrors directly adjacent either side of the DCM10k 216 were employed (as shown in FIG. 5), and other mirrors in the MEMSs 200, 202 used to cause the optical signals to traverse the DCM2k5 212. In this particular instance, the second optical waveguide portion 221 is used (as shown in FIG. 5) instead of the third optical waveguide portion 223 (as shown in FIG. 4). It should be noted that there are in fact many optical pathways and many different mirrors that could be used to achieve the same total dispersion compensation.

Figure 6:
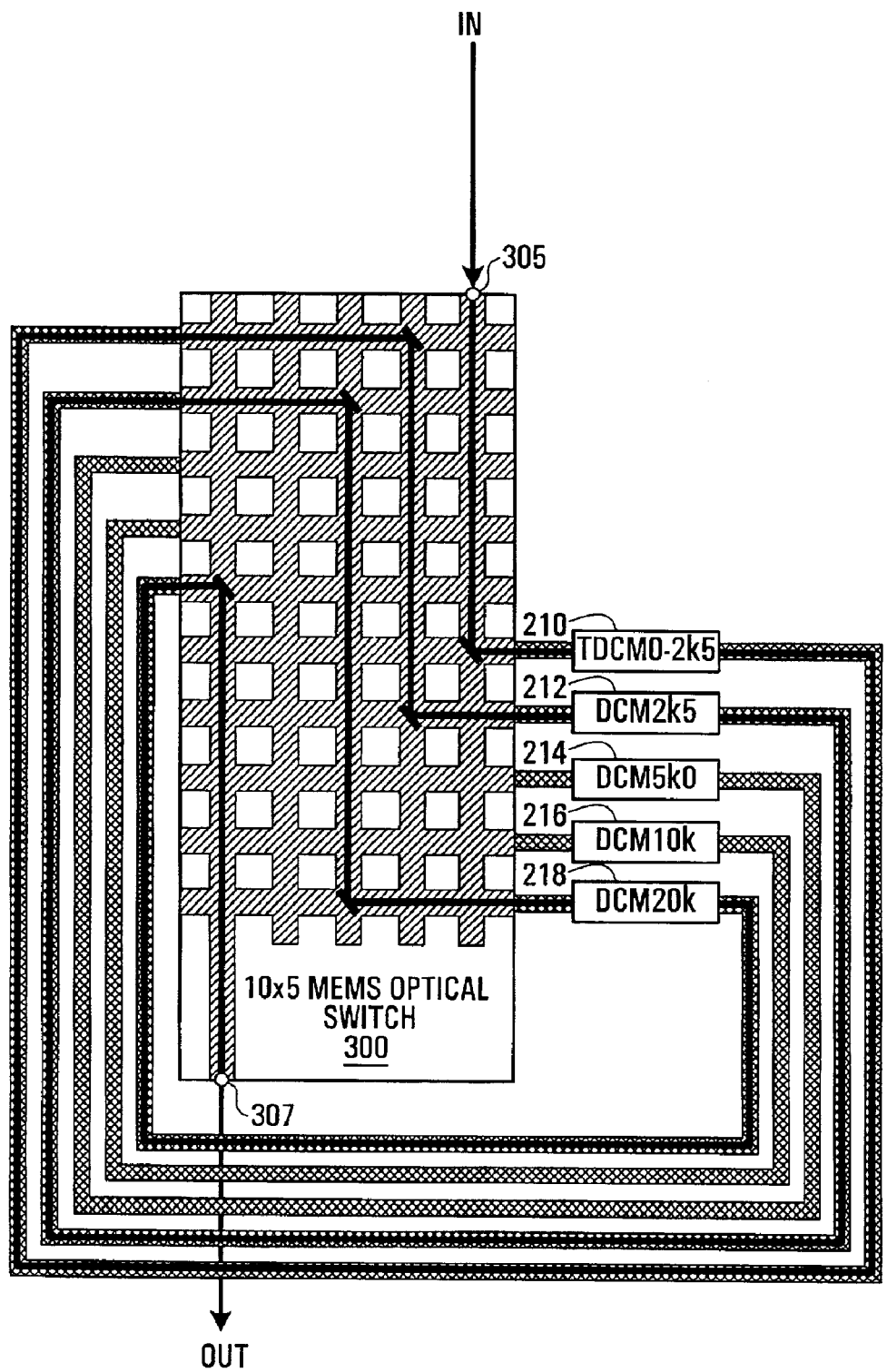
FIG. 6 is a diagram of a RDCM dispersion compensation switching array constructed according to an embodiment of the invention, using a single MEMS optical switch, rated for 40 km SMF dispersion compensation, including a tunable DCM, in operation, and set to an actual dispersion compensation of 22.5 km–25 km.

Referring now to FIG. 6, a single MEMS RDCM dispersion compensation switching array constructed according to an embodiment of the invention rated for 40 km SMF dispersion compensation, including a tunable DCM, in operation, and set to an actual dispersion compensation of 25 km is discussed. In comparison with FIG. 3, the dispersion compensation switching array of FIG. 6 is different in many respects. First, instead of employing two 5×5 MEMS optical switches, this embodiment uses a single 10×5 MEMS optical switch 300, second, the set of output ports and input ports used are not 90 degrees relative to each other, and thirdly, a tunable dispersion compensator TDCM 0–2k5 210 is included. The TDCM 0–2k5 210 is tunable to a range of 0 km to 2.5 km dispersion compensation, and preferably is an FBG tunable DCM. Since the TDCM 0–2k5 210 may take on a continuum of values from 0 to 2.5 km, the dispersion compensation of the dispersion compensation switching array is equal to the sum of the fixed DCM elements employed and any value between 0 km–2.5 km compensation that the TDCM 0–2k5 210 is set to.

In FIG. 6, an optical signal path on which incoming optical signals are traversing is connected to the single 10×5 MEMS optical switch 300 at an input 305. An optical signal path on which outgoing optical signals traverse is connected to the single 10×5 MEMS optical switch 300 at an output 307. Five output ports of the single 10×5 MEMS optical switch 300 are connected through respective optical waveguides and five DCMs, four fixed DCMs, DCM2k5 212, DCM5k0 214, DCM10k 216, and DCM20k 218 and one tunable DCM, TDCM 0–2k5 210, to four input ports of the single 10×5 MEMS optical switch 300. In this embodiment, the set of output ports and the set of input ports used (other than the input 305 and the output 307) are chosen to be oriented at zero degrees relative to each other. Connections used by the RDCM Controller 156 for controlling the switching array are not shown in the diagram.

The single 10×5 MEMS optical switch 300 is controllably set to allow the optical signal input to the input 305 to traverse the TDCM 0–2k5 210 back to an input of the single 10×5 MEMS optical switch 300. The single 10×5 MEMS optical switch 300 is controllably set to allow that optical signal to traverse the DCM2k5 212 back to another input of the single 10×5 MEMS optical switch 300. The single 10×5 MEMS optical switch 300 is controllably set to allow that optical signal to traverse the DCM20k 218 back to another input of the single 10×5 MEMS optical switch 300. The single 10×5 MEMS optical switch 300 is controllably set to allow that optical signal to be output from the output 307. The result of the signal having passed through each of these DCM elements is a dispersion compensation of (0 km–2.5 km)+2.5 km+20 km=22.5 km–25 km. As described above, a series of DCMs arranged into stages as shown in FIG. 3 has a resolution equal to the compensation of the stage one DCM. In FIG. 6 the four DCMs, DCM2k5 212, DCM5k0 214, DCM10k 216, and DCM20k 218 form such an arrangement and hence these four DCMs have themselves a resolution of 2.5 km, and can achieve a dispersion compensation equal to every value which is a multiple of 2.5 km up to its maximum of 37.5 km. The presence of the TDCM 0–2k5 210 means that none of the gaps remain, and the RDCM built according to the arrangement in FIG. 6 can achieve a dispersion compensation of any value between 0 km–40 km with no gaps, having a continuous resolution. In general a preferred embodiment according to this arrangement has a TDCM with a tuning range equal to the dispersion compensation value of the stage one DCM of the remaining fixed dispersion compensation elements.

It should be noted that in a general, a MEMS RDCM dispersion compensation switching array using a single MEMS optical switch need not be configured exactly as shown in FIG. 6. An embodiment having five DCMs as in FIG. 6 could use a 5×5 MEMS optical switch or even a 5×1 MEMS optical switch, however redundancy and hence failure protection diminishes as implementations use MEMSs of smaller and smaller dimensions. In fact an embodiment implementing a single 5×1 MEMS would have no failure protection, and would be implemented using a MEMS having double sided mirrors instead of single sided mirrors.

Figure 7:
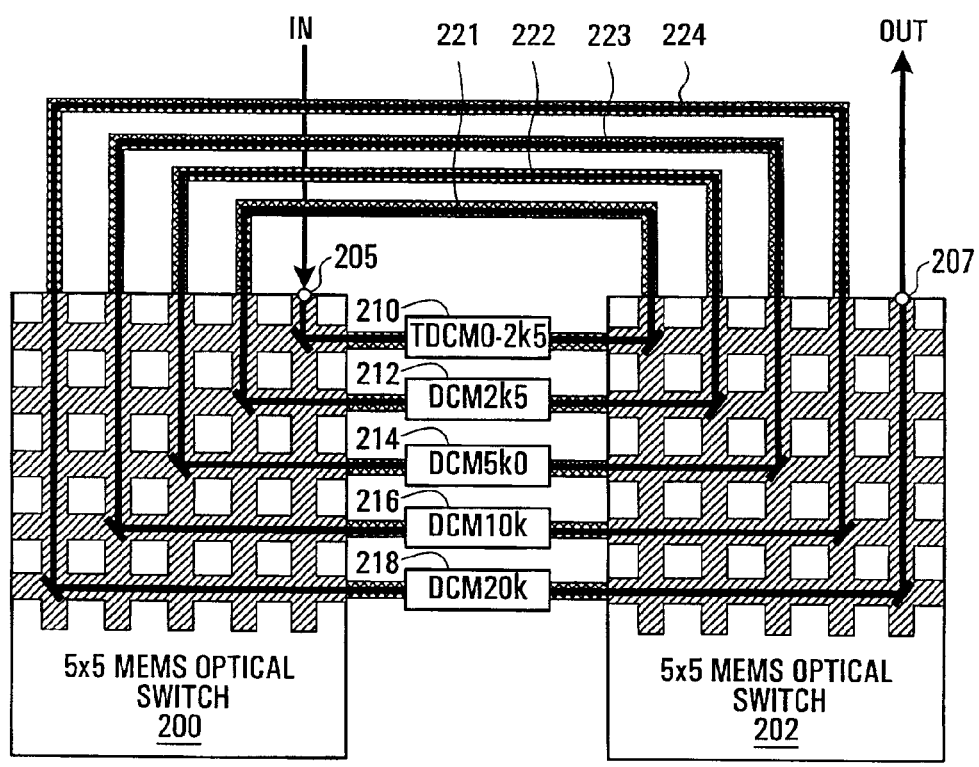
FIG. 7 is a diagram of an RDCM dispersion compensation switching array constructed according to an embodiment of the invention rated for 40 km SMF dispersion compensation, including a tunable DCM, in operation, and set to an actual dispersion compensation of 40 km.

A variation of the RDCM dispersion compensation switching array of FIG. 3 is depicted in FIG. 7. Instead of the first optical waveguide portion 211 optically connected between the first MEMS optical switch 200 and the second MEMS optical switch 202, a tunable dispersion compensator TDCM 0–2k5 210 is optically connected therebetween. As with the embodiment depicted in FIG. 6, the presence of the TDCM 0–2k5 210 means that none of the gaps in the dispersion compensation provided by the fixed DCMs of the RDCM remains, and the RDCM built according to the arrangement in FIG. 7 can achieve a dispersion compensation of any value between 0 km–40 km having a continuous resolution. In general a preferred embodiment according to this arrangement has a TDCM with a tuning range equal to the dispersion compensation value of the stage one DCM of the remaining fixed dispersion compensation elements, which here is the DCM2k5 212 having a dispersion compensation of 2.5 km.

Figure 8:
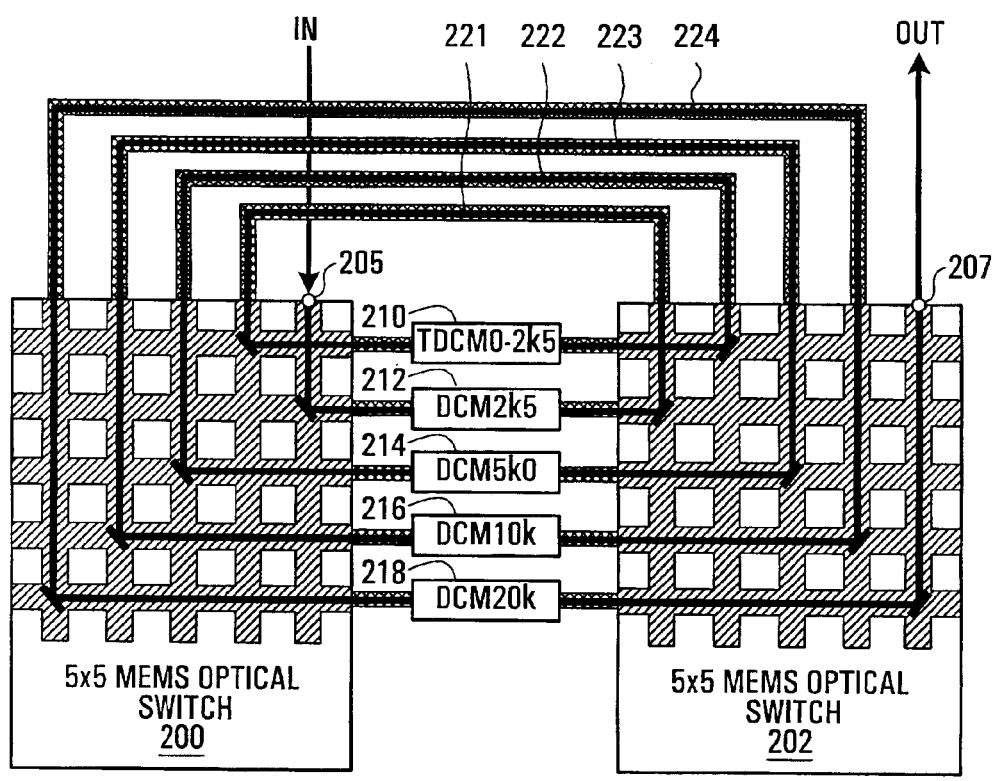
FIG. 8 is a diagram of an RDCM dispersion compensation switching array of FIG. 7 in operation set to an actual dispersion compensation of 40 km, illustrating failure protection of the preferred embodiment.

Referring now to FIG. 8 the RDCM dispersion compensation switching array of FIG. 7 in operation having a different operational state than that of FIG. 7 is described. In FIG. 8, the same DCMs and the same optical waveguide portions are employed as illustrated in FIG. 7, however, different waveguides and mirrors inside the MEMS optical switches are being used which illustrate redundancy and failure protection. It should be noted that even though all of the optical waveguide portions are used, namely the first 221, second 222, third 223, and fourth 224 optical waveguide portions, and all output ports of the first and second MEMS optical switches 200, 202 adjacent to the dispersion compensation modules 210, 212, 214, 216, and 218 are used in both configurations, there are in fact many different optical pathways and many different mirrors in the MEMs that could be controllably set and used to achieve the same total dispersion compensation.

Figure 9:
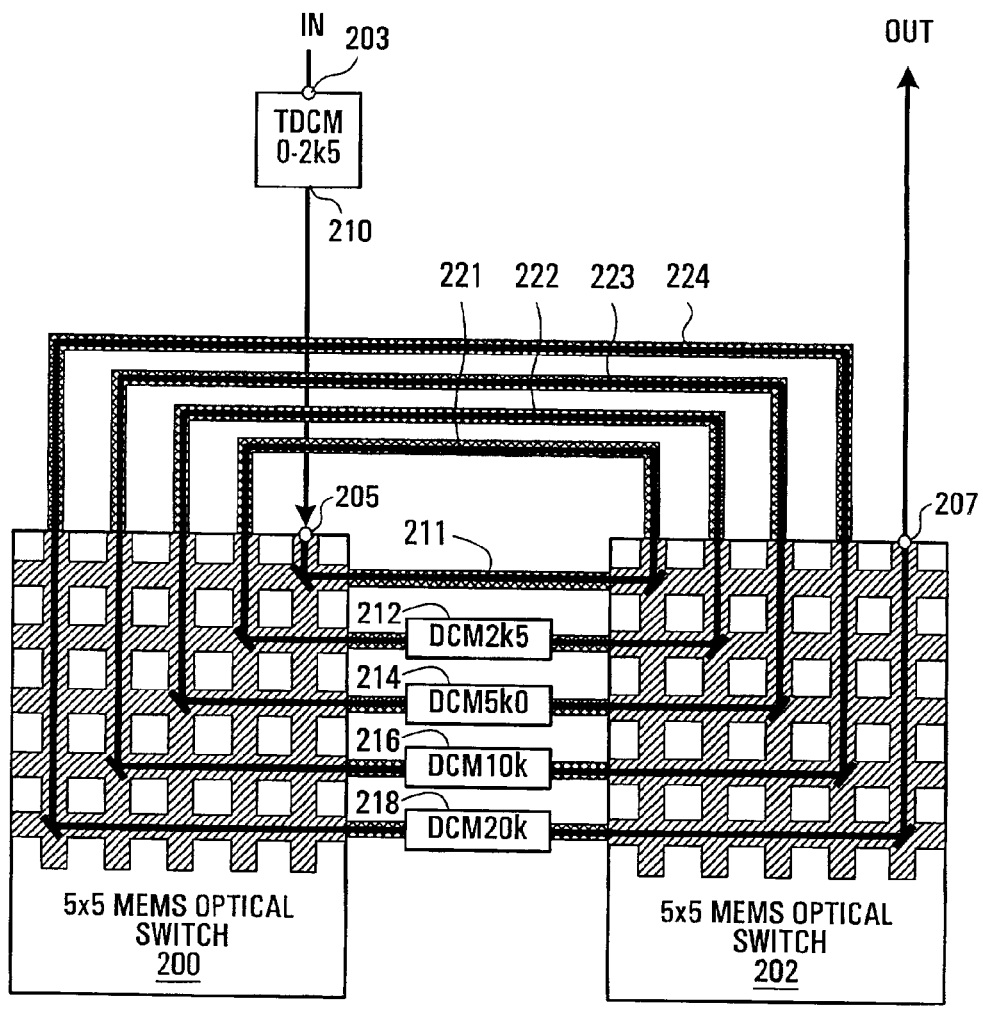
FIG. 9 is a diagram of a variation of the RDCM dispersion compensation switching array of FIG. 7.

A variation of the RDCM dispersion compensation switching array of FIG. 7 is depicted in FIG. 9. Instead of the TDCM –2k5 210 being situated between the MEMS optical switches 200 and 202, the TDCM –2k5 210 is placed before input 205, and is itself connected to the optical signal path on which incoming optical signals are traversing, at input 203. As was the case in the embodiment described in association with FIG. 3, a fifth optical waveguide portion 211 is connected to an output of the first 5×5 MEMS optical switch 200 and an input of the second 5×5 MEMS optical switch 202.

Figure 10:
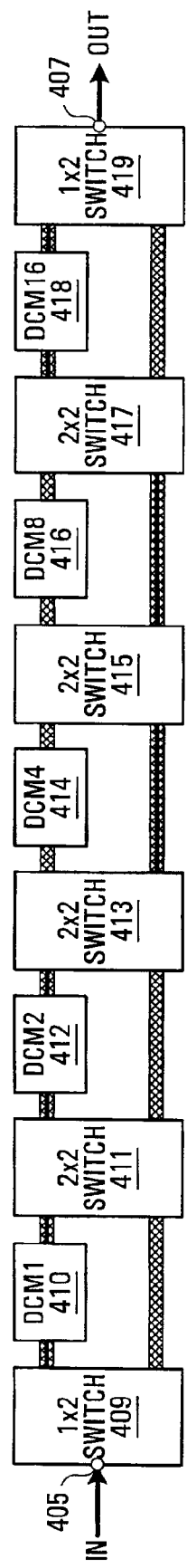
FIG. 10 is a diagram of an RDCM dispersion compensation switching array constructed according to an embodiment of the invention utilizing cascaded switches rated for 31 units of dispersion compensation, set to an actual dispersion compensation of 19 units.

Referring to FIG. 10, an RDCM dispersion compensation switching array constructed according to an embodiment of the invention utilizing cascaded switches rated for 31 units of dispersion compensation, set to an actual dispersion compensation of 19 units is described. In this preferred embodiment, the array of controllable optical switches comprise a first 1×2 optical switch 409, a second 1×2 optical switch 419, and four 2×2 optical switches 411, 413, 415, and 417. An optical signal path on which incoming optical signals are traversing is connected to the first 1×2 optical switch 409 at an input 405. A first output of the first 1×2 optical switch 409 is connected through a dispersion compensation module DCM1 410 to a first input of a first 2×2 optical switch 411. A second output of the first 1×2 optical switch 409 is connected through an optical waveguide portion to the second input of the first 2×2 optical switch 411. A first output of the first 2×2 optical switch 411 is connected through a dispersion compensation module DCM2 412 to a first input of a second 2×2 optical switch 413. A second output of the first 2×2 optical switch 411 is connected through an optical waveguide portion to the second input of the second 2×2 optical switch 413. A first output of the second 2×2 optical switch 413 is connected through a dispersion compensation module DCM4 414 to a first input of a third 2×2 optical switch 415. A second output of the second 2×2 optical switch 413 is connected through an optical waveguide portion to the second input of the third 2×2 optical switch 415. A first output of the third 2×2 optical switch 415 is connected through a dispersion compensation module DCM8 416 to a first input of a fourth 2×2 optical switch 417. A second output of the third 2×2 optical switch 415 is connected through an optical waveguide portion to the second input of the fourth 2×2 optical switch 417. A first output of the fourth 2×2 optical switch 417 is connected through a dispersion compensation module DCM16 418 to a first input of the second 1×2 optical switch 419. A second output of the fourth 2×2 optical switch 417 is connected through an optical waveguide portion to the second input of the second 1×2 optical switch 419. An optical signal path on which outgoing optical signals traverse is connected to the second 1×2 optical switch 419 at an output 407.

In the configuration of this preferred embodiment, the fixed DCMs are arranged in cascaded stages where a DCM of a stage has a dispersion compensation value of twice that of the DCM of the previous stage. For example, in FIG. 10 the stage one DCM, DCM1 410, has a dispersion compensation sufficient to compensate for one unit (for this embodiment relative amounts of dispersion compensation are referred to) of fiber dispersion, the stage two DCM, DCM2 412 has a dispersion compensation sufficient to compensate for two units of fiber dispersion (twice that of stage one), the stage three DCM, DCM4 414 has a dispersion compensation sufficient to compensate for four units of fiber dispersion (twice that of stage two), the stage four DCM, DCM8 416 has a dispersion compensation sufficient to compensate for eight units of fiber dispersion (twice that of stage three), and the stage five DCM, DCM16 418 has a dispersion compensation sufficient to compensate for 16 units of fiber dispersion (twice that of stage four). More generally, as in the previous embodiments, the set of N DCMs in this cascaded embodiment arranged in stages have a set of dispersion compensation values equal to $\{V, 2V, 4V, \ldots 2N-1V\}$ where V is the dispersion compensation value of the stage one DCM. The 1×2 and 2×2 optical switches are controllably set to employ the correct number and choice of DCMs, and optical waveguide portions to effect a desired dispersion compensation to the optical signal originally input at input 405, to be output at output 407. Connections used by the RDCM Controller 156 for controlling the switches are not shown in the diagram.

The RDCM dispersion compensation switching array of FIG. 10 in operation, is set to an actual compensation of 19 units SMF. The first 1×2 optical switch 409 is controllably set to output on its first output an optical signal input from input 405, to traverse the DCM1 410 to the first input of the first 2×2 optical switch 411. The first 2×2 optical switch 411 is controllably set to output to its first output an optical signal input to its first input to traverse the DCM2 412 to the first input of the second 2×2 optical switch 413. The second 2×2 optical switch 413 is controllably set to output to its second output an optical signal input to its first input to traverse the optical waveguide portion to the second input of the third 2×2 optical switch 415. The third 2×2 optical switch 415 is controllably set to output to its second output an optical signal input to its second input to traverse the optical waveguide portion to the second input of the fourth 2×2 optical switch 417. The fourth 2×2 optical switch 417 is controllably set to output to its first output an optical signal input to its second input to traverse the DCM16 418 to the first input of the second 1×2 optical switch 419. The second 1×2 optical switch 419 is controllably set to output to its output 407 an optical signal input to its first input to form the output of the RDCM dispersion compensation switching array. The result of the signal having passed through each of these DCM elements is a dispersion compensation of 1+2+16=19 units.

Although the preferred embodiments are depicted as having four or five DCMs, and having MEMS optical switches of particular dimensions, namely 5×5 and 10×5, it should be understood that the general arrangement according to the preferred embodiments depicted in FIG. 3 and FIG. 6 involves any number of DCMs used in association with MEMSs having any dimension capable of being set to allow optical signals to traverse the DCMs in all desired combinations. The embodiments depicted in FIGS. 3–7 could employ, for example, 7×5 or 5×7 or even 6×1 MEMSs (with appropriate arrangement of inputs and outputs).

In determining the capacity of the fixed dispersion compensators within the RDCM, the following equations are helpful in determining the maximum dispersion compensation achievable by the fixed dispersion compensators, and the maximum fiber distance which can be compensated by this method.

Let X (ps/nm) be the maximum acceptable residual dispersion in the system, which corresponds to half the dispersion compensated by the stage one fixed DCM (here our units are not km but the equations are still applicable).

The total actual dispersion compensation (MaxDC) of a series of fixed DCMs used in accordance with the invention can be calculated as:

$$MaxDC = \sum_{n=0}^{N-1} X \cdot 2^{n+1} = 2X \cdot (2^N - 1)$$

Where N is the total number of fixed DCMS, and n is the (stage number−1) of a fixed DCM. As described above, each $m^{th}$ stage DCM has a dispersion compensation twice that of the $(m-1)^{th}$ stage DCM. Also as described above, the MaxDC is the actual maximum amount of dispersion compensated by the DCMs, however, the RDCM is suitable for compensating the MaxDC plus the maximum acceptable residual dispersion X.

Let Y be the dispersion coefficient for the transmission fiber. This dispersion coefficient is different for different wavelengths as well as for different fiber types of which single mode fiber (SMF), two wave reduced slope (TWRS) and large effective area fiber (LEAF) which are the most popular examples.

The maximum fiber distance (MaxFD) which can be compensated by this method, when all DCM stages are in use is:

$$MaxFD = \frac{\sum_{n=0}^{N-1} X \cdot 2^{n+1}}{Y} = \frac{2X \cdot (2^N - 1)}{Y}$$

The figures illustrate arrangements for which these values are useful. For example in the arrangement of FIG. 3, X/Y (the maximum acceptable residual dispersion expressed in km) is 1.25 km, and N=4, giving a MaxFD=2·(1.25 km)·$(2^4-1)$=2·(1.25 km)·15=37.5 km. Adding the 1.25 km acceptable dispersion we arrive at a suitable dispersion compensation of 38.75 km. To calculate the actual dispersion compensation of an arrangement like that shown in FIGS. 6 and 7, the MaxCD or MaxED of the fixed DCMs may be added to the TDCM compensation value or respectively fiber distance. Since the compensation value of the TDCM is preferably equal to that of the stage one DCM to obtain the MaxDC and the MaxFD for such an arrangement one need only add a single term of respectively 2X and 2X/Y.

An additional example arrangement for which these values would be useful is a set of fixed DCMs achieving an actual 77.5 km SMF dispersion compensation, namely a DCM2k5, a DCM5k0, a DCM10k, a DCM20k, and a DCM40k. In an arrangement according to FIG. 3 the resolution would be 2.5 km, the actual maximum would be 77.5 km and if the acceptable maximum residual dispersion were 1.25 km, the RDCM would be suitable for 78.75 km. If the 2.5 km fixed DCM were replaced with a TDCM −5k0, the RDCM would have a continuous resolution, and would be capable of compensating 0 km–80 km SMF dispersion.

An alternative arrangement to that shown in FIG. 9 could replace the TDCM −2k5 210 with a TDCM 0–1k25, and employ an additional fixed DCM1k25 with a dispersion compensation of 1.25 km, if a TDCM having a smaller range but better optical characteristics is preferred. The alternative arrangement of FIG. 9 would still be capable of achieving a continuous range of dispersion compensation of 0 km–40 km.

Other alternative arrangements for an RDCM's dispersion compensation switching array constructed according to the invention could use a single 5×5×2 three dimensional MEMS optical switch, with appropriate optical wave guide connections. These conceptually have the same topology as FIG. 3 except the 5×5 arrays shown are simply sub-sections of a single 5×5×2 array. Other alternative arrangements could also use two 5×1 MEMS optical switches with appropriate looping optical wave guide connections.

It should be understood that although MEMSs are employed as the controllable optical switches of the preferred embodiments, the invention contemplates any other optical switching arrangement, using for example waveguide switches or even mechanical switches, which is adapted to employ selected DCMs for dispersion compensation of optical signals. Other examples of controllable optical switching arrays are thermo-capillary optical switches which use the presence or absence of a drop of liquid at an intersection point of a grid of waveguides to reflect or transmit optical signals, and bubble technology (such as that developed by Agilent™) which works by a similar process.

It should be noted that although the embodiments illustrated have incorporated MEMS optical switches which have mirrors oriented in a single direction only, it is contemplated by the invention that MEMS optical switches could be constructed with mirrors facing in different directions.

To reduce any possible polarization dependent loss (PDL) that an RDCM exhibits due to the use of multiple MEMS optical switches and the mirrors therein, a polarization scrambler, circular polarizer, or polarization controller may be applied to the input optical signal so that PDL is reduced.

It also should be understood that although the preferred embodiments and the equations above describe a system having DCMs whose dispersion compensation values are related in a specific manner to one another, any combination of DCMs having any desired dispersion compensation values is contemplated by the invention.

In should also be understood that although the preferred embodiments have been described as employing discrete dispersion compensation, optical switching and controlling elements, the invention contemplates any combination of discrete elements and elements integrated onto chips, and contemplates embodiments wherein all dispersion compensation, optical switching and controlling elements are integrated onto a single chip.

Numerous modifications and variations of the present invention are possible in light of the above teachings. It is therefore to be understood that within the scope of the appended claims, the invention may be practiced otherwise than as specifically described herein.

We claim:

1. A re-configurable dispersion compensation module comprising:
   a plurality of dispersion compensation elements;
   at least one controllable optical switch including a MEMS optical switch; and
   a controller,
wherein the at least one controllable optical switch is optically coupled to an optical signal path, and coupled to the plurality of dispersion compensation elements, said at least one controllable optical switch controlled by the controller to couple a selected number of the plurality of dispersion compensation elements to the optical signal path for compensating the dispersion of optical signals therein.

2. The re-configurable dispersion compensation module of claim 1 wherein the plurality of dispersion compensation elements comprises N fixed dispersion compensation elements having respectively dispersion compensation values of $2^{N-1}V$.

3. The re-configurable dispersion compensation module of claim 2 wherein the plurality of dispersion compensation elements further comprises at least one tunable dispersion compensation element.

4. The re-configurable dispersion compensation module of claim 3 wherein at least one of the at least one tunable dispersion compensation element has a dispersion compensation value equal to V.

5. The re-configurable dispersion compensation module of claim 4 wherein the tunable dispersion compensation element is coupled to the at least one controllable optical switch and the optical signal path.

6. The re-configurable dispersion compensation module of claim 2 wherein the at least one controllable switch comprises:

a first 1×2 optical switch optically coupled to an optical signal path by an input;
   a second 1×2 optical switch optically coupled to the optical signal path by an output; and
   (N−1) 2×2 optical switches;
wherein the first 1×2 optical switch, the second 1×2 optical switch, the (N−1) 2×2 optical switches, and the N fixed dispersion compensation elements are coupled in a cascaded arrangement.

7. The re-configurable dispersion compensation module of claim 1 wherein the plurality of dispersion compensation elements comprises a set of fixed dispersion compensation elements, and at least one tunable dispersion compensation element.

8. The re-configurable dispersion compensation module of claim 1 wherein the controller is controlled by messages received along a control signal path coupled to the controller.

9. The re-configurable dispersion compensation module of claim 8 wherein the controller transmits information along the control signal path.

10. A re-configurable dispersion compensation module comprising:
   a set of N fixed dispersion compensation elements having respectively dispersion compensation values of $2^{N-1}V$;
   a tunable dispersion compensation element having a dispersion compensation value equal to V;
   a 2(N+1)×(N+1) MEMS optical switch optically coupled to an optical signal path by a first input, and optically coupled to the optical signal path by an (N+2)th output; and
   a controller,
wherein respective first to Nth outputs of the 2(N+1)×(N+1) MEMS optical switch are coupled to respective inputs of the N fixed dispersion compensation elements, respective second to (N+1)th inputs of the 2(N+1)×(N+1) MEMS optical switch are coupled to respective outputs of the N fixed dispersion compensation elements, an (N+1)th output of the 2(N+1)×(N+1) MEMS optical switch is coupled to an input of the tunable dispersion compensation element, an (N+2)th input of the 2(N+1)×(N+1) MEMS optical switch is coupled to an output of tile tunable dispersion compensation element, said 2(N+1)×(N+1) MEMS optical switch controlled by the controller to couple a selected number of the tunable dispersion compensation element and the N fixed dispersion compensation elements to the optical signal path for compensating the dispersion of optical signals therein.

11. A re-configurable dispersion compensation module comprising:
   a set of N fixed dispersion compensation elements having respectively dispersion compensation values of $2^{N-1}V$;
   a tunable dispersion compensation element having a dispersion compensation value equal to V;
   a first (N+1)×(N+1) MEMS optical switch optically coupled to an optical signal path by a first input;
   a second (N+1)×(N+1) MEMS optical switch optically coupled to the optical signal path by an (N+1)th output; and
   a controller,
wherein a first output of the first (N+1)×(N+1) MEMS optical switch is coupled to an input of the tunable dispersion compensation element, an output of the tunable dispersion compensation element is coupled to a first input of the second (N+1)×(N+1) MEMS optical switch, respective second to (N+1)th outputs of the first (N+1)×(N+1) MEMS optical switch ape coupled to respective inputs of the N fixed dispersion compensation elements, respective outputs of the N fixed dispersion compensation elements are coupled to respective second to (N+1)th inputs of the second (N+1)×(N+1) MEMS optical switch, respective first to N-1 output of the second (N+1)×(N+1) MEMS optical switch are coupled to respective second to (N+1)th inputs of the first (N+1)×(N+1) MEMS optical switch, said first and second (N+1)×(N+1) MEMS optical switches controlled by the controller to couple a selected number of the tunable dispersion compensation element and the N fixed dispersion compensation elements to the optical signal path for compensating the dispersion of optical signals therein.

12. A re-configurable dispersion compensation module comprising:
   a plurality of dispersion compensation elements; and
   at least one controllable optical switch including a MEMS optical switch,
wherein the at least one controllable optical switch is optically coupled to an optical signal path, and coupled to the plurality of dispersion compensation elements, said at least one controllable optical switch adapted to be controlled to couple a selected number of the plurality of dispersion compensation elements to the optical signal path for compensating the dispersion of optical signals therein.

13. The re-configurable dispersion compensation module of claim 12 wherein the plurality of dispersion compensation elements comprises N fixed dispersion compensation elements having respectively dispersion compensation values of $2^{N-1}V$.

14. The re-configurable dispersion compensation module of claim 13 wherein the plurality of dispersion compensation elements further comprises at least one tunable dispersion compensation clement.

15. The re-configurable dispersion compensation module of claim 14 wherein at least one of the one tunable dispersion compensation clement has a dispersion compensation equal to V.

16. The re-configurable dispersion compensation module of claim 13 wherein the at least one controllable switch comprises:
   a first 1×2 optical switch optically coupled to an optical signal path by an input;
   a second 1×2 optical switch optically coupled to the optical signal path by an output; and
   (N−1) 2×2 optical switches;
wherein the first 1×2 optical switch, the second 1×2 optical switch, the (N−1) 2×2 optical switches, and the N fixed dispersion compensation elements are coupled in a cascaded arrangement.

17. The re-configurable dispersion compensation module of claim 12 wherein the plurality of dispersion compensation elements comprises a set of fixed dispersion compensation elements, and at least one tunable dispersion compensation element.

18. A re-configurable dispersion compensation module comprising:
   a set of N fixed dispersion compensation elements having respectively dispersion compensation values of $2^{N-1}V$;
   a tunable dispersion compensation element having a dispersion compensation value equal to V; and
   a 2(N+1)×(N+1) MEMS optical switch optically coupled to an optical signal path by a first input, and optically coupled to the optical signal path by an (N+2)th output, wherein respective first to Nth outputs of the 2(N+1)×(N+1) MEMS optical switch are coupled to respective inputs of the N fixed dispersion compensation elements, respective second to (N+1)th inputs of the 2(N+1)×(N+1) MEMS optical switch are coupled to respective outputs of the N fixed dispersion compensation elements, an (N+1)th output of the 2(N+1)×(N+1) MEMS optical switch is coupled to an input of the tunable dispersion compensation element, an (N+2)th input of the 2(N+1)×(N+1) MEMS optical switch is coupled to an output of the tunable dispersion compensation element, said 2(N+1)×(N+1) MEMS optical switch is adapted to be controlled to couple a selected number of the tunable dispersion compensation element and the N fixed dispersion compensation elements to the optical signal path for compensating the dispersion of optical signals therein.

19. A re-configurable dispersion compensation module comprising:
   a set of N fixed dispersion compensation elements having respectively dispersion compensation values of $2^{N-1}V$;
   a tunable dispersion compensation element having a dispersion compensation value equal to V;
   a first (N+1)×(N+1) MEMS optical switch optically coupled to an optical signal path by a first input; and
   a second (N+1)×(N+1) MEMS optical switch optically coupled to the optical signal path by an (N+1)th output,
wherein a first output of the first (N+1)×(N+1) MEMS optical switch is coupled to an input of the tunable dispersion compensation element, an output of the tunable dispersion compensation element is coupled to a first input of the second (N+1)×(N+1) MEMS optical switch, respective second to (N+1)th outputs of the first (N+1)×(N+1) MEMS optical switch are coupled to respective inputs of the N fixed dispersion compensation elements, respective outputs of the N fixed dispersion compensation elements are coupled to respective second to (N+1)th inputs of the second (N+1)×(N+1) MEMS optical switch, respective first to Nth outputs of the second (N+1)×(N+1) MEMS optical switch are coupled to respective second to (N+1)th inputs of first (N+1)×(N+1) MEMS optical switch, said first and second (N+1)×(N+1) MEMS optical switches adapted to be controlled to couple a selected number of the tunable dispersion compensation element and the N fixed dispersion compensation elements to the optical signal path for compensating the dispersion of optical signals therein.

20. A re-configurable dispersion compensation module comprising:
   a set of N fixed dispersion compensation elements;
   a tunable dispersion compensation element;
   a MEMS optical switch optically coupled to an optical input signal path by a first input, and optically coupled to an optical output signal path by an output, including a plurality of second optical inputs and second optical outputs; and
   a controller,
wherein the plurality of second optical outputs are coupled to respective input of the N fixed dispersion compensation elements and a respective input of the tunable dispersion compensation element, respective plurality of second inputs of the MEMS optical switch being coupled to respective outputs of the N fixed dispersion compensation elements and a respective output of the tunable dispersion compensation element, the MEMS optical switch controlled by the controller to couple a selected number of the tunable dispersion compensation element and the N fixed dispersion compensation elements to the optical signal path for compensating the dispersion of optical signals therein.

* * * * *